(12) United States Patent
Fischer

(10) Patent No.: US 7,832,076 B2
(45) Date of Patent: Nov. 16, 2010

(54) METHOD FOR A WATERTIGHT CONNECTION IN A WATER SERVICE

(75) Inventor: Neal William Fischer, Hinckley, IL (US)

(73) Assignee: Nee Corp., Hinkley, IL (US)

(*) Notice: Subject to any disclaimer, the term of this patent is extended or adjusted under 35 U.S.C. 154(b) by 82 days.

(21) Appl. No.: 11/999,885

(22) Filed: Dec. 7, 2007

(65) Prior Publication Data

US 2008/0086883 A1 Apr. 17, 2008

Related U.S. Application Data

(62) Division of application No. 11/089,240, filed on Mar. 24, 2005, now abandoned.

(51) Int. Cl.
*B23P 11/02* (2006.01)
(52) U.S. Cl. .................. 29/507; 29/506; 29/890.14; 29/890.144; 285/36; 285/89; 285/333
(58) Field of Classification Search ............. 29/506, 29/507, 890.14, 890.144; 285/21.1, 36, 40, 285/49, 89, 213, 222.5, 247, 254, 255, 256, 285/333, 908
See application file for complete search history.

(56) References Cited

U.S. PATENT DOCUMENTS

| | | | | |
|---|---|---|---|---|
| 2,112,238 A | * | 3/1938 | Guarnaschelli | .......... 285/222.5 |
| 2,177,095 A | * | 10/1939 | Cowles | .......... 285/256 |
| 2,314,315 A | * | 3/1943 | Scheele | .......... 285/213 |
| 2,333,349 A | * | 11/1943 | Weatherhead, Jr. | .......... 29/506 |
| 2,338,665 A | * | 1/1944 | Nelson | .......... 29/890.144 |
| 2,517,706 A | * | 8/1950 | Paquin | .......... 29/890.144 |
| 3,047,937 A | * | 8/1962 | De Vecchi | .......... 29/890.14 |
| 3,313,315 A | | 4/1967 | Rothwell | |
| 4,270,695 A | | 6/1981 | Carson | |
| 4,308,886 A | | 1/1982 | Handley et al. | |
| 4,310,015 A | | 1/1982 | Stewart et al. | |
| 4,346,920 A | * | 8/1982 | Dailey | .......... 285/89 |
| 4,712,809 A | * | 12/1987 | Legris | .......... 285/21.1 |
| 5,131,145 A | * | 7/1992 | Badoureaux | .......... 29/890.144 |
| 5,430,929 A | * | 7/1995 | Sanders | .......... 29/507 |
| 5,730,180 A | | 3/1998 | Alberico | |
| 5,957,505 A | | 9/1999 | Jarvenkyla | |
| 5,984,372 A | * | 11/1999 | Cwik et al. | .......... 285/49 |

(Continued)

FOREIGN PATENT DOCUMENTS

DE 3622167 7/1988

(Continued)

*Primary Examiner*—Rick K Chang
(74) *Attorney, Agent, or Firm*—McDonald Hopkins LLC; Michael J. Femal

(57) ABSTRACT

An improved seal and method for providing a watertight compression joint connection between a valve or fitting and a flare end of a copper tubing in a water service. The improvement includes an O-ring seal on a bull nose end of a valve and a frictional material inserted into straight AWWA threads on a male inlet or outlet of the valve to sealingly engage a flared end of the copper tubing to the bull nose end and to frictionally engage a flare nut with the tubing back onto the matching bull nose end of the valve when screwing the flare nut onto the male threads of the valve, respectively.

10 Claims, 4 Drawing Sheets

U.S. PATENT DOCUMENTS

| | | | | |
|---|---|---|---|---|
| 6,095,571 | A * | 8/2000 | MacDuff | 285/256 |
| 6,523,261 | B1 * | 2/2003 | Sedlak et al. | 29/890.141 |
| 7,240,928 | B2 * | 7/2007 | Evans et al. | 285/333 |

FOREIGN PATENT DOCUMENTS

| | | |
|---|---|---|
| DE | 19542062 | 5/1997 |
| DE | 19623513 | 12/1997 |
| DE | 20320265 U | 5/2004 |
| EP | 1029987 A1 | 8/2000 |
| EP | 1306601 | 2/2003 |
| EP | 1321587 | 6/2003 |
| EP | 1495253 | 10/2003 |
| EP | 1552204 | 10/2003 |
| EP | 1576308 | 6/2004 |
| EP | 1581764 | 7/2004 |
| EP | 1597507 | 9/2004 |
| EP | 1599688 | 9/2004 |
| EP | 1486713 | 12/2004 |
| EP | 1591707 | 2/2005 |
| EP | 1682804 | 5/2005 |
| EP | 1682805 | 5/2005 |
| EP | 1697677 | 6/2005 |
| EP | 1586801 A1 | 10/2005 |
| EP | 1807647 | 11/2005 |
| EP | 1756462 | 12/2005 |
| EP | 1717503 A2 | 2/2006 |
| EP | 1827704 | 6/2006 |
| EP | 1836428 | 6/2006 |
| EP | 1858703 | 9/2006 |
| EP | 1859189 | 9/2006 |
| EP | 1893903 | 3/2007 |
| EP | 1860363 | 11/2007 |
| GB | 975471 | 11/1964 |
| JP | 57123333 | 7/1982 |
| JP | 8121641 | 5/1996 |
| JP | 11041770 | 2/1999 |
| JP | 2000017639 | 1/2000 |
| JP | 2000033673 | 2/2000 |
| JP | 2000170958 | 6/2000 |
| JP | 2000283339 | 10/2000 |
| JP | 2001289347 | 10/2001 |
| JP | 2001348915 | 12/2001 |
| JP | 2002340300 | 11/2002 |
| JP | 2004052375 | 2/2004 |
| RU | 2209889 C1 | 11/2001 |

\* cited by examiner

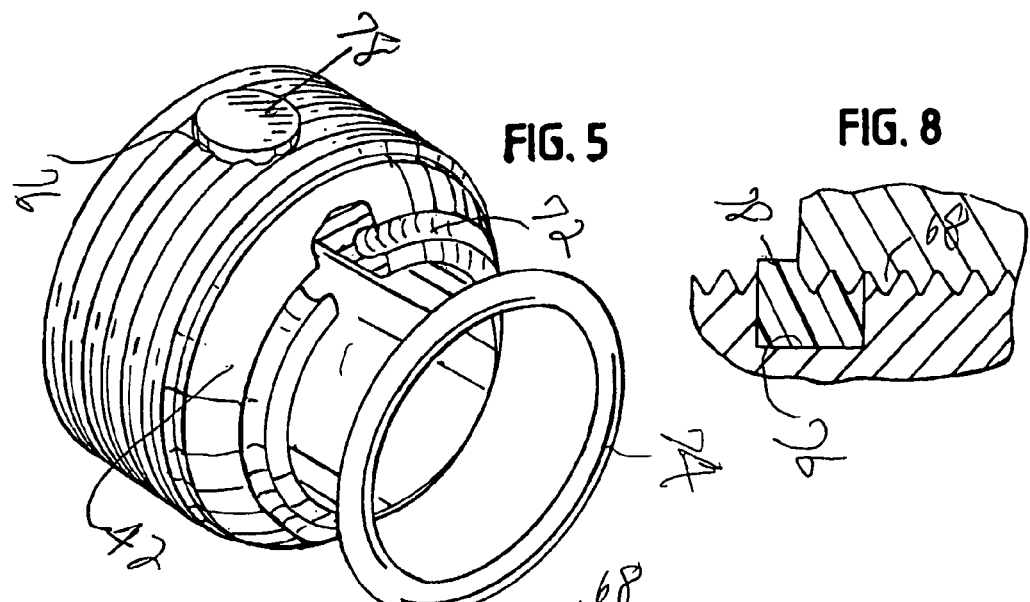
FIG. 5
FIG. 8
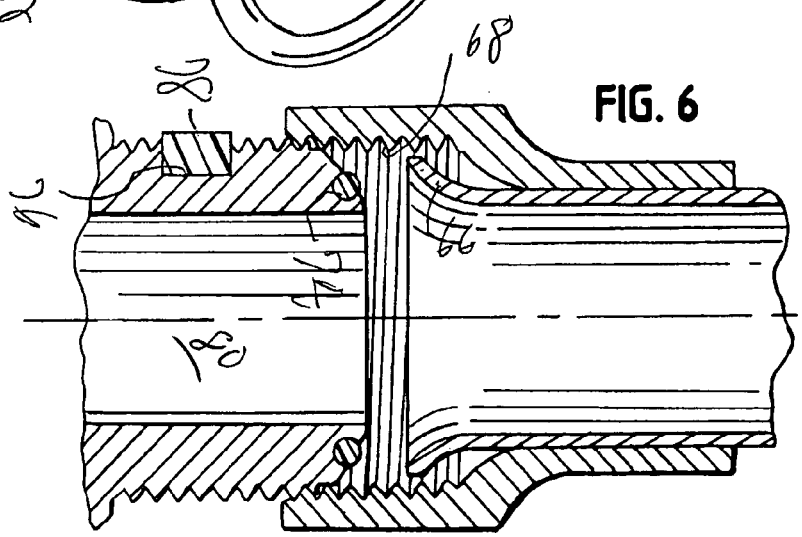
FIG. 6
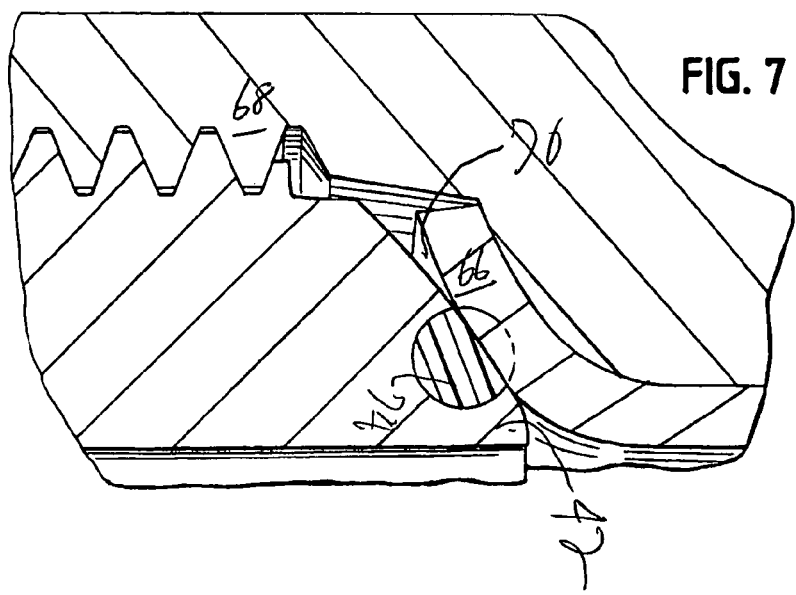
FIG. 7

METHOD FOR A WATERTIGHT CONNECTION IN A WATER SERVICE

CROSS-REFERENCE TO RELATED APPLICATIONS

This application is a divisional of U.S. patent application Ser. No. 11/089,240 filed Mar. 24, 2005 now abandoned, which is incorporated by reference in its entireties.

BACKGROUND OF THE INVENTION

This invention relates to a seal and method for a watertight connection in a water service and, more particularly, to a seal and method for a watertight compression joint in a water service between the valve or fitting and the flared end of copper tubing used in an underground water service system. Several underground water service joints connections are required in a typical water service installation for all residential and commercial buildings in a municipality. A water service installation requires the skilled efforts of a knowledgeable contractor to furnish the labor, material, accessories and equipment necessary to construct a workmanlike underground water service. The work includes excavation, trenching and furnishing and laying of water pipe with its joint connections and other products according to a municipality's building codes and specification. As soon as the waterline and its joint connections are completed and prior to the backfill of the trench, all water joint connections are tested in place by water under city pressure to detect any defects or leaks. If any defects or leaks are discovered the contractor is responsible to make necessary repairs at his expense. Afterwards, backfilling is commenced as soon as the waterline and its connections have been measured and accepted by the city engineer and a certificate given for the water service installation. The contractor must avoid disturbing existing utilities and protect adjacent public and private property while making the water service connections. In short, this is a very labor intensive and expensive work to properly install an underground water service.

Generally, in a typical underground water service connected to a city water main, a type "K" soft copper tubing is used for the water pipe, and therefore, all joint connections in such a water system are generally flared tubing and valves forming the compression joints. All copper tubing that is typically laid in the trench from a Corporation Stop to a Curb Stop, is laid as a single piece without joints between these two Stops. So the Corporation Stop includes generally a tapered AWWA/CC inlet threads which is also referred to as C.C. threads, C.S. threads or Mueller threads that screw into the female threads in a service saddle attached to a city water main. The Corporation Stop further includes a straight threaded male outlet with a bull nose end that mates to one female flared end of the copper tubing with a flare nut that secures onto the threaded male portion of the outlet bull nose end to compress the joint there between. The copper tubing, which is generally 2" or less in diameter for a municipal water service extends in one piece within the water service trench to a male inlet with a bull nose for the Curb Stop. The Curb Stop male inlet includes straight AWWA threads for a female flare nut at the other end of the one piece copper tubing ending in a female flared end to mate with the bull nose of the curb inlet when the flare nut is tightened onto the inlet threads to form the compression joint. The male outlet of the Curb Stop similar to the above mentioned inlet joint also forms a compression joint with copper tubing extending from the Curb Stop to an intermediate Service Fitting or to an entrance value in the building receiving the water service. The Service Fitting or Union Joint intermediate the Curb Stop and the building receiving the water service may also have a male inlet and outlet with a bull nose end on each to mate with the female flared end of the copper tubing forming a compression joint with the Service Fitting or Union Joint. The number of Service Fittings or Union Joints is dependent upon the distance between the Curb Stop and the building receiving the underground water service.

All products that are connected to a public water system must meet American National Standards Institute (ANSI)/National Sanitation Foundation (NSF) and International Standards, as appropriate. The aforementioned copper tubing for the water pipe that is usually the Type "K" copper tubing for all underground water services, is 2 inches or smaller. The joints for the copper services usually require copper tubing flared at its ends connected between brass valves or fittings to form the compression joints. Valves or fittings suitable to meet most city building codes for compression joints are typically manufactured by such companies as Mueller, Ford or McDonald and are made from lead-free brass castings. Such a brass valve like the Corporation Stop includes American Water Works Association Standard Thread/Corporation Cock (AWWA/CC), in which this thread has a steeper taper on the inlet versus the Male National Straight Pipe Threads on its outlet forming the compression joint with the flared end of the copper tubing.

However, the connections between the various brass valves or fittings and copper tubing are also a major source of leaks for contractors that usually develop after installation by vibration and earth settlement or movement in and around the trench in which the contractor lays the water service components. Even the backfilling process itself or future road restorations or heavy vehicle traffic can set up vibrations or earth moment around these connections that may result in a future water leak within the contractor's warranty period for the work. Sometimes under testing conditions with city engineers before the backfill process, small leaks in the system are detected causing a contractor to snub down the flare nuts further on the threads of the valve or fitting by over tightening to stop the minor water leak with a wrench causing the brass body of the valve or fitting to internally or externally distort or crack resulting once again in future leaks in the underground water service system.

Therefore, contractors not only need to be skilled in their trade and use the aforementioned high quality manufactured products for these connections but any means or method that makes these compression joints between components in the underground water service system more resistant to minor water leaks during installation or to subsequent leaks after installation from vibrations and the like is a most desirable improvement to the installed water service system. Any improvement against vibration or other causes of compression joint leaks after the installation of the water service system will greatly reduce contractor's overhead and subsequent service calls to repair leaks at their expense and thus save the contractor from possibly losing money on water service jobs.

Accordingly, it is an object of the present invention to provide a vibration resistant and watertight sealing method for compression joints in a water service system having an improved watertight sealing means between the water pipe and the valves or fittings.

It is a another object of the invention to provide a watertight, vibration resistant sealing system for compression joints in a water service that is inexpensive, yet highly resistant to most types of vibrations and earth movements around the service fittings and waterline tubing.

It is a further object of the invention to provide a seal and method for watertight compression joints in a water service system that avoids over tightening flare nuts on valves or fittings yet form a watertight seal resistant to loosing through vibration or earth movements around the compression joints in the system.

Yet another object of the invention to provide a seal and method for watertight compression joints in a water service system which includes an annular sealing means on the male member of the valve or fitting and a friction means on the threads of the male member of a valve or fitting to sealingly engage the compression joint components in a watertight seal and to frictionally engage a flare nut on the male member of the valve or fitting to prevent future leaks due to vibration or earth movements in and around the water service joints wherein the flare nut loosens and backs off the male member.

It is a further object of the invention to provide a seal and method for forming watertight compression joints in a water service system which includes a rectangular shaped O-ring on the male end of a valve or fitting to sealingly engage the female mating surface of the water pipe tubing to prevent installation and future water leaks in the system.

It is yet another object of the invention to provide a watertight compression joint in an underground water system between a valve or fitting and its tubing in which a sealing O-ring and a frictional material on the male portion of the valve or fitting mates with the tubing and a flare nut in a sealingly and frictionally engaging manner, respectively, to prevent installation and subsequent water leaks due to vibration or earth settlement around the water service compression joints or fittings to prevent over tightening with a wrench on the flare nut resulting in concealed damage to other components in the waterline system leading to future water leaks.

SUMMARY OF THE INVENTION

In accordance with the present invention, the foregoing objects are met by providing a seal and method for an obtaining watertight compression joints in an underground water service system. Various valves or fittings in an underground water service include a straight threaded male member with a bull nose end for engaging a flared end of copper tubing used in the water service system. Such valves and other fittings such as Corporation Stops, Curb Stops and other Service Fittings sealingly engage the female flared end of a copper tubing to form a watertight compression joint when screwing a female flare nut with the flared female tube backing onto a matching portion of the bull nose end of the valve or fitting and then securely wrench tightening a flare nut thereon. An improved seal and method for providing a watertight compression joint connection between a valve or fitting and a female flared end of a copper tubing without over tightening the flare nut in an underground water service is a highly desirable condition for a contractor upon completion of the installation. Over tightening with a wrench during installation to stop a minor water leak in such a system can distort the brass body of a valve or fitting or even cause damage to the mated copper tubing resulting in a failure at a later date resulting in a water leak.

The invention concerns an O-ring seal recessed into an annular groove on the bull nose end of a valve or fitting and a fixedly, frictional material of a predetermined size inserted into a hole in the straight AWWA threads on the male inlet or outlet of the valve or fitting to sealingly engage a female flared end of a copper tubing onto the matching bull nose end and to frictionally engage a flare nut as it is securely tightened onto the straight threads of the valve or fitting, respectively.

Yet another aspect of the invention concerns the provision of a watertight and vibration resistant sealing method for providing a watertight compression joint connection between a valve or fitting and a flared end of a copper tubing in an underground water service including a rectangular-ring seal incorporated into a bull nose end of an inlet or outlet to the valve or fitting at a predetermined distance from its end and a frictional material inserted into straight AWWA threads on a male inlet or outlet of the valve or fitting to sealingly engage a female flared end of the copper tubing to the bull nose end and to frictionally engage a flare nut with the tubing back onto the matching bull nose end of the valve when screwing the flare nut onto the male threads the valve, respectively, wherein a watertight compression joint is formed that is highly resistant to vibration and other moments of the earth around the compression joint to prevent subsequent water leaks at the compression joints.

The one piece copper tubing with a flare nuts at either end that connects the outlet of the Corporation Stop to the inlet of the Curb Stop are often the two compression joints that are most subject to subsequent vibrations and potential settling of the city water main or the water service components of the installation resulting in future water leaks at these two compression joints. In addition, before the backfilling occurs, the Corporation and Curb Stops are the most likely to see over tightening with a wrench at these compression joints to stop minor leaks at inspection time that can distort or crack the body of the brass valve or fitting as well as the attached copper tubing. This over tightening factor can later lead to water leaks from a damaged body of the valve or fitting that may not be apparent at the time of the installation and inspection by the city.

Therefore, any additional sealing method for making these compression joints more watertight without over tightening of the connections to avoid leaks caused by either damage to the distorted body of the valve or fitting or caused by future vibrations and settlings of the earth around the water service fittings is an important step in preventing those future water leaks. The sealing method for a valve or fitting in an underground water service includes the steps of removing a threaded flare nut from the valve or fitting on its male inlet or outlet having generally straight AWWA threads for tightening the flare nut thereon and having a bull nose end; milling an annular recess of a predetermined depth and cross section on the bull nose end of the male inlet or outlet to receive a sealing ring for forming a compression joint; placing any suitable annular gasket and generally O-ring type material into the annular recess in which approximately half of O-ring cross section resides within the annular recess; flaring an end of a copper tubing wherein the outer diameter of the flare extends out to the threads in the flare nut; milling out a hole of a predetermined size and depth rearwardly on the straight threads of each male outlet or inlet; inserting a frictional material into the hole extending outwardly toward the top of the straight threads and engaging the threads of the flare nut; and screwing the flare nut with the copper tube back onto the bull nose inlet or outlet of the valve or fitting wherein the bull nose and its O-ring gasket form a watertight compression joint with the flared end of the copper tubing and the frictional material engaging the flare nut threads prevents the flare nut from loosening during vibration or movement of the earth around the compression joints in the underground water service.

The annular recess in the bull nose further includes an annular, rectangular cross section recess to receive a generally rectangular shape O-ring that engages the mating surface of the female flared tubing back of the copper such that its rectangular surface forms a watertight compression joint when screwing the flare nut onto the straight threads of the male inlet or outlet. In addition, the male inlet or outlet straight threads includes a circular hole with a Teflon gasket material inserted therein to provide a frictional contact with the threads of the flare nut when it is tightened onto the male inlet or outlet straight threads with a wrench to prevent the flare nut from loosing on the threads during vibrations or earth movements around the compression joints in the underground water service.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention, which is not necessarily represented by any one embodiment.

BRIEF DESCRIPTION OF THE DRAWINGS

FIG. 5 is an enlarged detailed partial perspective of either the male inlet or outlet with a conical bull nose end and sealing ring of a valve or fitting in a partially assembled condition as shown in FIGS. 2, 3 and 4.

FIG. 6 is an enlarged partially sectional view of the coupling of the male inlet or outlet with the waterline in partially assembled condition as shown in FIGS. 2, 3 and 4;

FIG. 7 is an enlarged cross-sectional side view of the sealing of the compression joint of FIG. 1;

FIG. 8 is a view similar to FIGS. 7 and 8 showing another feature of the inventive coupling of the male inlet or outlet with the waterline;

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
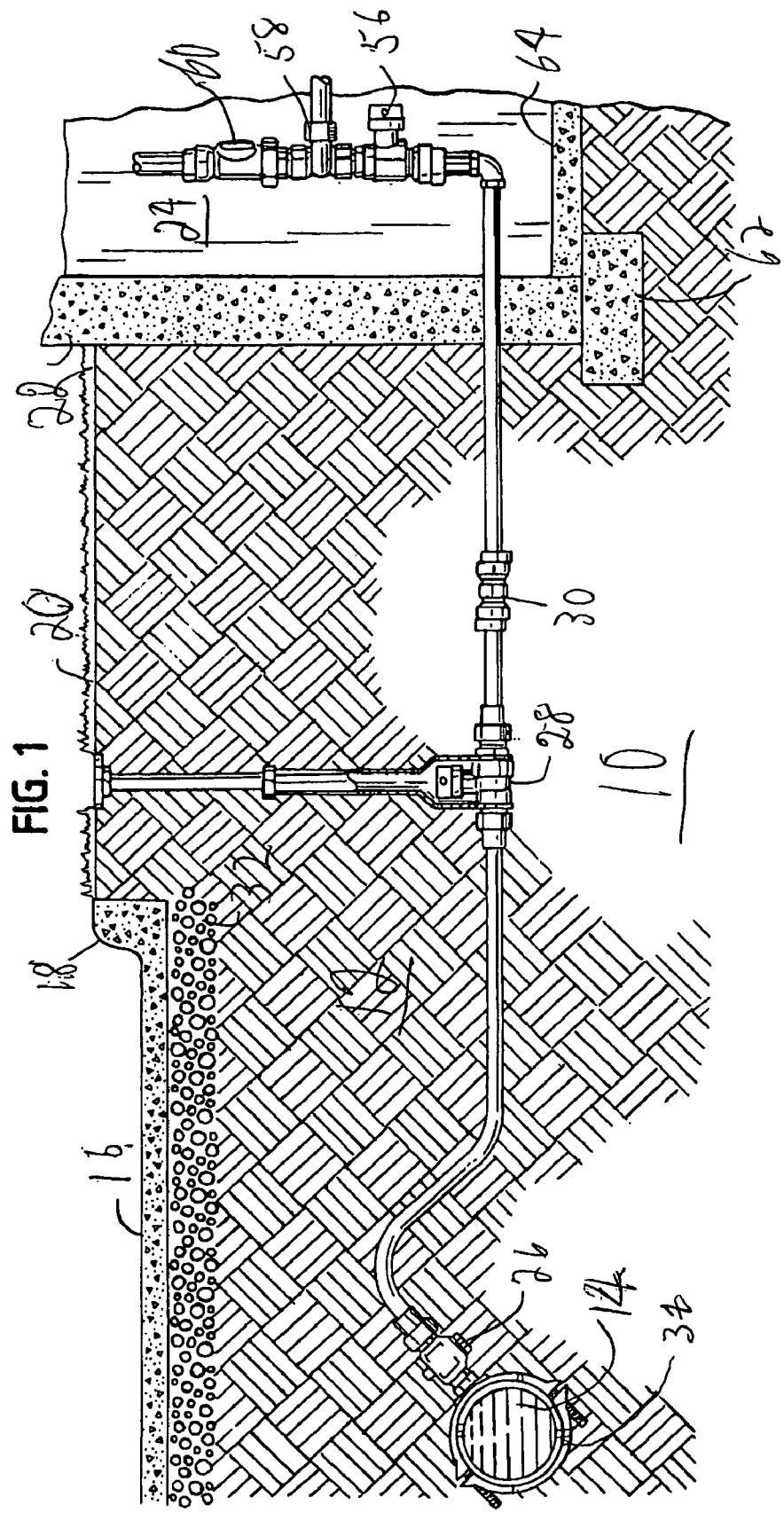
FIG. 1 shows an overall perspective view of an installed underground water service system incorporating the basic components in accordance with the present invention.
Figure 2:
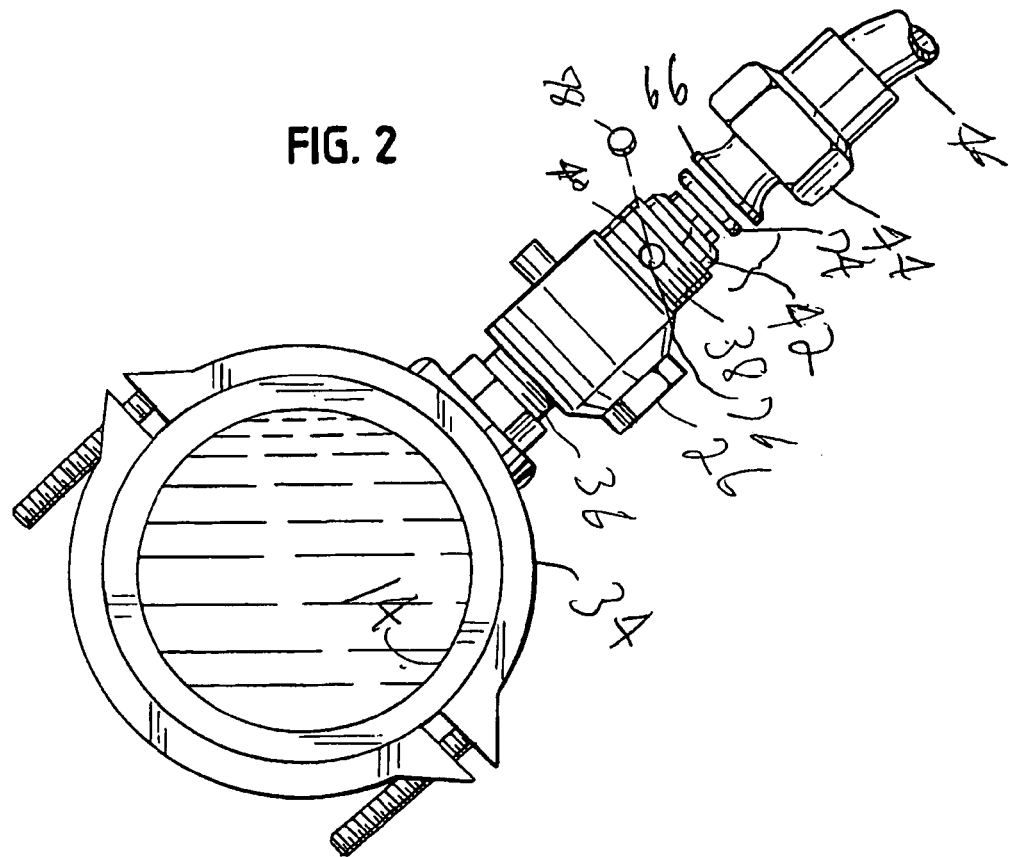
FIG. 2 is an enlarged partially sectional side view of a valve or fitting coupled to the water main and waterline in partially assembled condition of FIG. 1.
Figure 3:
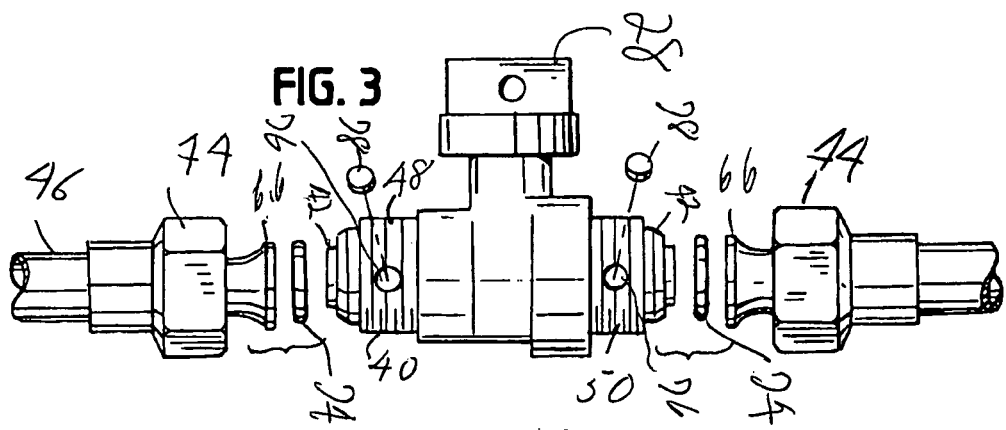
FIG. 3 is an enlarged side view of a valve or fitting coupled at either end to a waterline in partially assembled condition as shown in FIG. 1.
Figure 4:
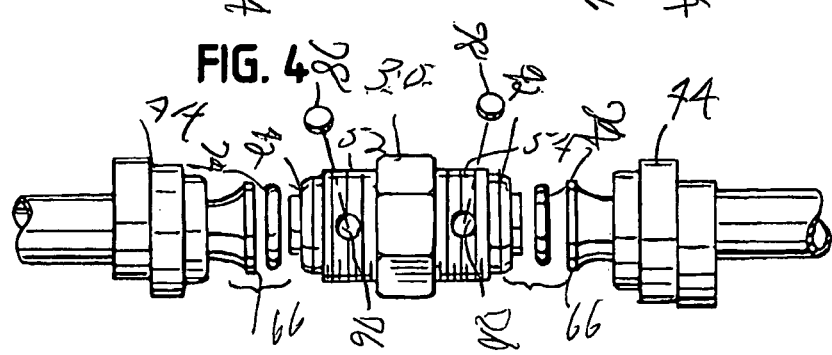
FIG. 4 is an enlarged side view of another valve or fitting coupled at either end to a waterline in a partially assembled condition as shown in FIG. 1.

FIG. 1 shows a layout of a typical underground water service system 10 in the northern part of the United States extending laterally below ground 12 when layed in an underground trench (not shown) from a city water main 14 under a paved street 16, past a curb 18 and then under a lawn or property 20 to and through a foundation wall 22 of a building 24 receiving the water service 10. As shown in FIGS. 1-4, valves or fittings 26, 28 and 30 including compression joints which require a watertight seal to prevent leaks in the water service system 10.

As shown in FIGS. 1-4, the city water main 14 is located a predetermined distance beneath the pavement of the city street 16 and its bed of gravel 32 or other suitable road material. The contractor installing the water service system 10 needs to cut through the pavement 16 and excavate to the water main 14 and then cuts a trench (not shown) extending from the water main 14 under the city street 16 to the foundation wall 22 of the building 24 receiving the water service 10. The contractor installed water service 10 is comprised generally of the following components. A service saddle 34 connects and clamps around the water main 14. A Corporation Stop 26 includes tapered inlet threads 36 at one end that screw into the service saddle 34 and a threaded male outlet 38 with straight AWWA threads 40 ending in a bull nose 42. The Corporation Stop 26 includes a female threaded flare nut 44 having threads complementary to the threads 40 on the male outlet 38 for screwing the flare nut 44 onto the male outlet 38. A copper tubing 46 connects the male outlet 38 of the Corporation Stop 26 to a male threaded inlet 48 having the same AWWA threads 40 of a Curb Stop 28 that includes the female threaded flare nut 44 on its inlet 48. The Curb Stop 28 includes a male threaded outlet 50 wherein both the inlet 48 and outlet 50 have the same straight AWWA threads 40 receiving the female threaded flare nuts 44 thereon to form a compression joint when tightened.

Copper tubing 46 connects the outlet 50 of the Curb Stop 28 to a subsequent number of Service Fittings 30 depending upon the distance between the Curb Stop 28 and the foundation wall 22 of the building 24. Each Service Fitting 30 includes a male threaded inlet 52 and a male threaded outlet 54, respectively; having AWWA threads 40 complementary to a pair of threaded flare nuts 44 that screw onto the inlet and outlet to form compression joints. Copper tubing 46 connects the male outlet 54 of the last Service Fitting 30 to an entrance valve 56 inside the building. The entrance valve 56 connects to a meter insetter 58 attached to the water meter that then connects to an inline dual check valve 60. The foundation wall 22 generally rests upon a building footing 62 along with a floor 64.

To form a compression joint between the valves or fittings 26, 28, 30 and the copper tubing 46, the contractor unscrews and removes the flare nuts 44 from the male inlets and outlets of the valves or fittings and then slips the nuts 44 onto the copper tubing 46. The contractor then flares an end 66 of each copper tubing 46 making sure the outer diameter of the flare end 66 extends out to internal threads 68 inside the flare nuts 44 and makes sure the flared end 66 of the copper tubing 46 is generally free from any nicks or defects in its backing or back 70 that engages the bull nose 42 of each threaded male inlet and outlet of the valves and fittings 26, 28 and 30. The contractor then screws each flare nut 44 with its tubing back 70 onto the matching bull nose end 42 of the valve or fitting and securely wrench tightens until the compression joint seals off any water leak between the valve or fitting and the flared end 66 of the copper tubing 46. The flared back portion 70 of the copper tubing 46 acts as a watertight gasket when engaging the bull nose end 42 of each inlet or outlet when locked into place by the flare nut 44. This coupling results in a high pull-out resistance and generally a leak proof compression joint. However, these types of compression joints are the very point where most leaks occur over time in a water service system 10 due to vibrations from heavy traffic in the street, road repairs or other similar things that cause the earth to move around these compression joints.

Turning now to FIG. 5 and in accordance with one embodiment of the invention, the end of the bull nose 42 of either a threaded male inlet or outlet includes an annular seal groove 72 normal to the longitudinal axis of either a male inlet or outlet of the valves or fittings of a predetermined milled depth to receive a portion of an O-ring 74 therein. The annular groove 72 is defined by a constant radius at least fifty percent of the diameter of the circular cross section of the O-ring 74. The o-ring is formed of an elastomeric material that is suitable for use with water over an extended period of time without degradation and generally is of a circular cross-section when the O-ring 74 is in an unstressed state but is readily deformable and compressible to form a seal between the metal surfaces of the bull nose 42 and the backing 70 of the flared copper tubing 46 when the flare nut 44 is tighten thereon.

In addition, FIGS. 2, 3, 4, 5, 6, 8, 9 and 10 shows a hole 76 of a predetermined milled depth in the threads 40 of each male inlet and outlet of each valve or fitting for inserting a frictional material 78 therein that extends upwardly to engagement with the female threads 68 of the flare nut 44 wherein the female threads 68 of the flare nut 44 frictionally engages the material 78 within the male threads 40 of each male inlet and outlet of the valve or fitting to prevent the flare nut 44 from backing off of the threads 40 of the male inlet or outlet of the valve or fitting that might permit water leakage due to vibration or other factors causing the flare nut 44 to loosen. In the previously mentioned Figs., milled hole 76 is generally circular in dimension and is of a depth not to penetrate into the internal water cambers 80 of the male inlet or outlet on the valve or fitting body 26, 28 and 30. The frictional material 78 is generally consists of a Teflon type material or the like that is water and chemically resistant over a long period of time. The female threaded flare nut 44 is tightened by the contractor on the straight AWWA male threaded inlet and outlet of each valve or fitting to form the compression joint. This coupling with the O-ring 74 compressed between the metal surfaces of the bull nose 42 and the back 70 of the copper tubing 46 assures that a watertight gasket effect occurs in additional to any watertight coupling of the metal surfaces between the bull nose and copper backing of the tubing when the flare nut is tightened by the contractor to form the compression joint. The contractor installs the flare nuts 44 onto the male inlets and outlets by using an open-ended box wrench to tighten the nuts thereon. The frictional material 78 engages the female threads 68 of the flare nut 44 as the nut 44 is being tightened and prevents the flare nut 44 from backing off at a later date due to vibrations and the like which might result in a water leak at the compression joints in the water service system 10.

FIG. 6 shows a cross section of the threaded male inlet or outlet with a bull nose end 42 having both the annular O-ring 74 in the semi-circular in cross-section groove 72 and a frictional material 78 inserted into the milled hole 76 in its male threads 40. A flare back end 70 of copper tubing 46 having a female threaded flare nut 44 therearound engages the straight AWWA male threads 40 on the inlet or outlet of each valve or fitting as it begins to be screwed onto the threads 40 of the male inlet or outlet to form the compression joint between the bull nose 42 and flare back 70 of the copper tubing 46. Although the valves and fittings shown in the drawings of this underground water service are generally cast or formed from brass, other alternative materials like steel, bronze, aluminum, plastic and yet unnamed materials may be used to form the compression joint when using this invention.

FIG. 7 shows the bull nose 42 with its O-ring 74 deformed and compressed against the backing 70 of the flare end 66 of copper tubing 46 when the flare nut 44 is fully tightened so that the O-ring 74 within the bull nose 42 sealingly engages both metal surfaces in the compression joint.

FIG. 8 shows the female threads 68 of the flare nut 44 engaging the frictional material 78 inserted into the hole 76 on either the male inlet or outlet preventing the flare nut 44 from backing off of the male threads 40 due to vibration or other movement of the copper tubing 46 during the normal life of a water service and thus preventing waters leaks attributable to such backing off or loosening of the flare nut 44 in its fully tightened position on the inlet or outlet of the valve or fitting.

Figure 9:
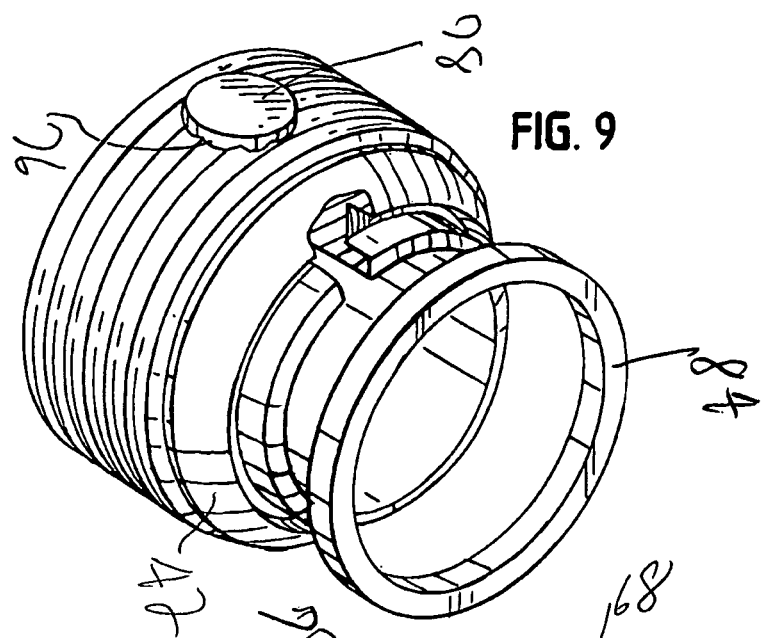
FIG. 9 is a view similar to FIG. 5 of another embodiment of sealing ring.

FIG. 9 shows generally a partial perspective of the male inlet or outlet ending in the bull nose 42 in accordance with the invention as previously shown in FIGS. 2, 3, 4, and 5 only this time the O-ring 74 takes a different shape and configuration which is a ring generally in a rectangular cross-section 82 instead of a circular cross-section and a seal groove 84 milled in the end of the bull nose 42 in a predetermined location which is semi-rectangular in cross-section and sized to receive the rectangular annular ring therein. The frictional material 78 and its hole 76 remain generally the same in size and function.

Figure 10:
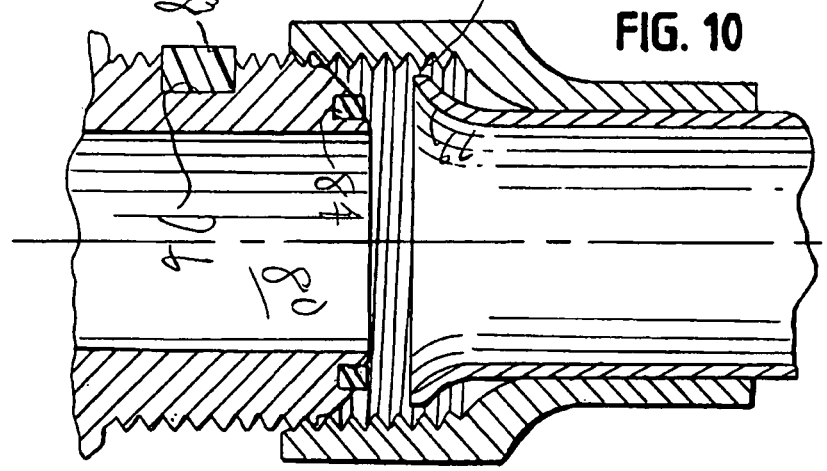
FIG. 10 is a view similar to FIG. 6 using another embodiment of the sealing ring as shown in FIG. 9.

FIG. 10 shows generally the same configuration in accordance with the invention as FIG. 6 only the O-ring 74 and its groove 72 are rectangular in cross-section providing an initial sharp point of contact with the copper backing 70 of the tubing 46 as deformation of the rectangular ring occurs when tightening the flare nut 44 onto the male threads 40 of the inlet or outlet of each valve or fitting. In short, this forms yet another highly desirable sealingly means to prevent any water leak in the compression joint. The frictional material 78 and its hole 76 on either the male inlet or outlet of a valve or fitting remain the same as shown in FIGS. 5 and 6 with the same function and results.

Figure 11:
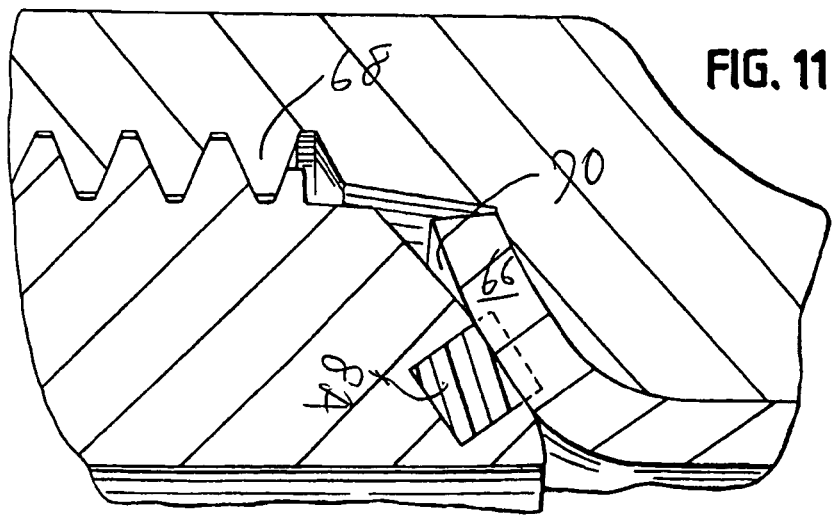
FIG. 11 is a view similar to FIG. 7 using another embodiment of the sealing ring as shown in FIG. 9.

FIG. 11 shows generally the same configuration in accordance with the invention as previously shown in FIG. 7, only the rectangular ring 82 is fully compressed and deformed between the two metal surfaces of the bull nose 42 and flare back 70 of the copper tubing 46 when the flare nut 44 is in its final tightened position to form a watertight compression joint resistant to future water leakage.

These and other improvements would be within the realm of an ordinary person skilled in the art of water service systems once reviewing this invention.

Having described and illustrated the principles of the invention in a preferred embodiment thereof, it should be apparent that the invention can be modified in arrangement, detail and various changes may be made and equivalents may be substituted for elements without departing from the spirit and scope of the invention as claimed.

I claim:

1. A method for forming a watertight compression joint in an underground water service system connected in an underground trench to a city water main generally underneath a paved street to a residential or commercial building receiving a municipal water service, the method comprising:

milling a groove closely adjacent to a bull nose end of a male threaded portion of a brass valve or fitting; inserting an elastomer partially disposed into the groove; milling a hole into the male threaded portion; inserting a frictional means partially disposed into the hole; removing a brass flare nut from the valve or fitting having female threads; slipping the flare nut onto a copper tubing cut to a predetermined length during a installation of the copper tubing and brass valves from the city water main underneath the paved street to the building; flaring an end of the copper tubing to cover a predetermined portion of the bull nose and the elastomer in the groove; making an outer diameter of the flared end extend out to the female threads in the flare nut without nicks or chips; screwing the flare nut with the flared end onto a matching bull nose end of the valve or fitting to form a compression joint between the bull nose and the flared end of the tubing and to cover the elastomer in a sealingly, watertight engagement, wherein the female threads of the flare nut engage the frictional means to further prevent the flare nut from subsequently backing off due to stress, vibration and other earth movement about the compression joints in the underground water service system.

2. The method of claim 1, wherein the groove is a partial circular cross-section.

3. The method of claim 2, wherein the elastomer matches the cross-section of an annular groove.

4. The method of claim 1, wherein the groove is a partial rectangular cross-section.

5. The method of claim 4, wherein the elastomer matches the cross-section of the groove.

6. The method of claim 1, wherein the elastomer is preferably formed from rubber, neoprene or other non-degradable with water or chemical material.

7. The method of claim 1, wherein the frictional means is formed from a Teflon or other equivalent material.

8. The method of claim 1, wherein the tubing is a K type copper.

9. The method of claim 1, wherein the valve or fitting is cast brass.

10. The method of claim 1, wherein the valve or fitting includes a water passage.

* * * * *